United States Patent [19]

Kern

[11] 4,276,869
[45] Jul. 7, 1981

[54] BARBECUE GRILL SLAB

[76] Inventor: Eugene F. Kern, 12115 Lake Meade Ct., Creve Coeur, Mo. 63141

[21] Appl. No.: 30,532

[22] Filed: Apr. 16, 1979

[51] Int. Cl.³ .......................... A47J 37/00; F24C 3/04
[52] U.S. Cl. .............................. 126/41 R; 126/25 R; 126/92 AC; 431/125
[58] Field of Search .................. 126/41, 92AC, 25; 431/125; 249/134

[56] References Cited

U.S. PATENT DOCUMENTS

| | | | |
|---|---|---|---|
| 2,244,045 | 6/1941 | Bobo | 126/41 R |
| 3,474,724 | 10/1969 | Jenn | 126/41 |
| 4,043,312 | 8/1977 | Kern | 126/41 R |

Primary Examiner—Samuel Scott
Assistant Examiner—Wesley S. Ratliff, Jr.
Attorney, Agent, or Firm—F. Travers Burgess

[57] ABSTRACT

A molded refractory slab for positioning in a barbecue grill between the burner unit and the heat-supporting grate has a plurality of uniformly spaced bosses simulating coals projecting upwardly from its top surface and integral dam means connecting adjacent bosses near the periphery of the slab to form a parapet for containing grease and rendered meat juices on the slab and preventing their dripping off the sides of the slab into the fire. The mold in which the slab is formed is of lightweight disposable material and is used as a protective container for shipping unfired slabs, which can then be fired during initial use of the slabs in barbecue grills.

7 Claims, 6 Drawing Figures

BARBECUE GRILL SLAB

BACKGROUND OF THE INVENTION

1. Field of the Invention

The invention relates to gas-fired barbecue grills and consists particularly in a ceramic slab mountable in such grills between the burners and the food-supporting grate.

2. The Prior Art

My U.S. Pat. No. 4,043,312 discloses a slab of refractory material for mounting in a gas-fired barbecue grill and formed with a plurality of spaced, upwardly projecting lumps simulating coals. No specific means were provided to prevent grease, drippings and the like from running off the edges of the slab into the fire.

SUMMARY OF THE INVENTION

The invention provides a coal-simulating slab of refractory material for positioning between the burners and the food-supporting grate of a gas-fired barbecue grill having means for preventing grease, meat drippings and the like from running off the edges of the slab into the fire.

An object of the invention is to provide means in co-operation with upwardly projecting simulated coals on a barbecue grill refractory slab for preventing grease and the like from running off the slab into the fire.

A further object is to provide a refractory slab for gas-fired barbecue grills in which the top surface of the slab has uniformly spaced bosses simulating coals and separated by narrow valleys and includes dam means in each of the valleys near their intersections with the edges of the slab for preventing grease and the like from flowing out of the valleys and over the edges of the slab into the fire.

A further object is to provide a protective shipping container for refractory slabs made in accordance with the invention.

An additional object is to utilize a mold of lightweight, disposable material for the slab as a protective part of the slab shipping container.

DETAILED DESCRIPTION OF THE INVENTION

Figure 1:
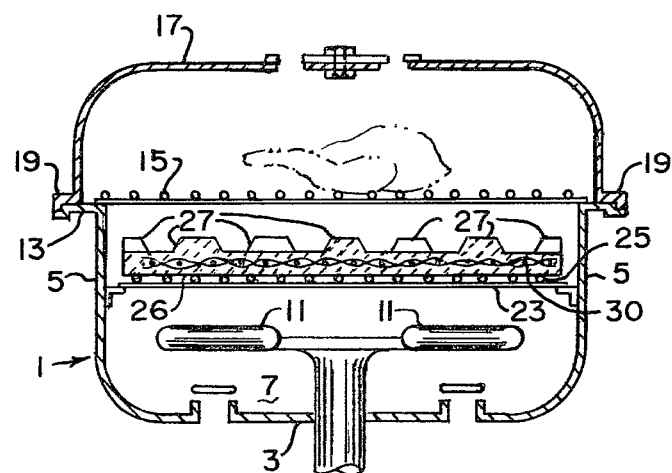
FIG. 1 is a transverse vertical sectional view of a gas-fired barbecue grill, including a refractory slab constructed in accordance with the invention.

A conventional gas-fired barbecue grill best seen in FIG. 1 has an upwardly open fire box 1 of generally rectangular shape in plan with a horizontal bottom wall 3 and upright side and end walls 5 and 7. A gas burner unit 9 positioned in the lower portion of fire box 1 has a plurality of upwardly facing burners 11. Side and end walls 5 and 7 are formed along their upper margins with an outwardly extending peripheral flange 13, on which a meat-supporting grate 15 is supported. A suitable downwardly open lid or cover 17, preferably hinged at one side to flange 13, is formed with a peripheral flange 19 along its lower rim for mating engagement with fire box flange 13.

Figure 2:
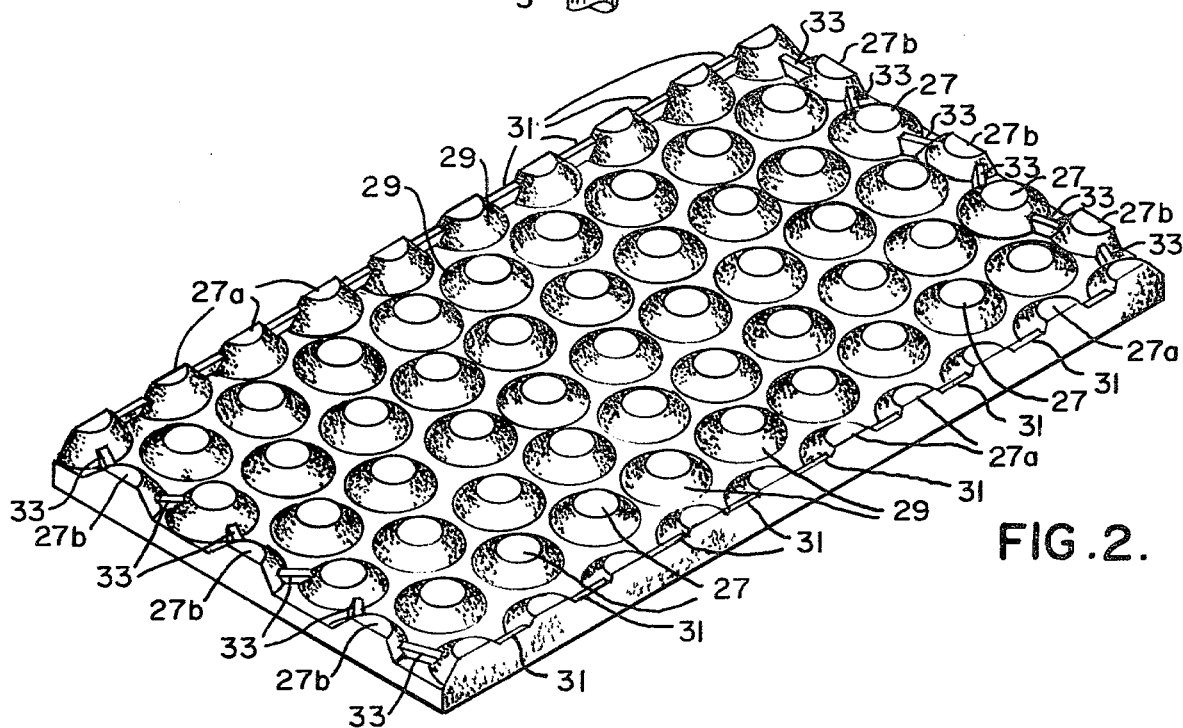
FIG. 2 is an isometric view of the refractory slab illustrated in FIG. 1.
Figure 3:
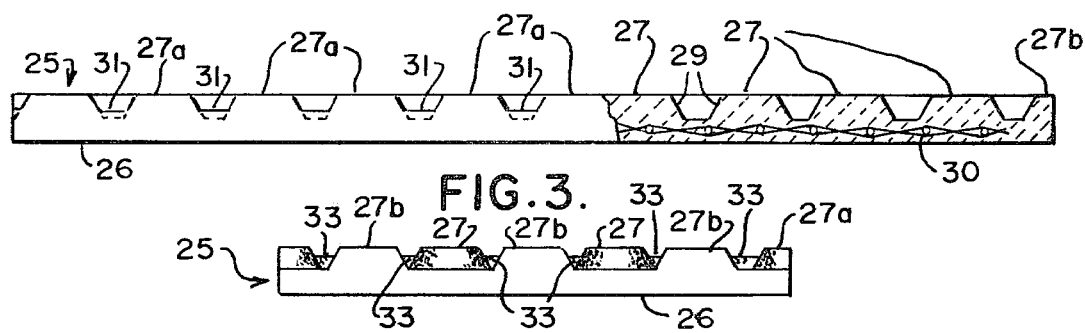
FIG. 3 is a side elevation, partially sectionalized, of the slab illustrated in FIG. 2.
Figure 4:
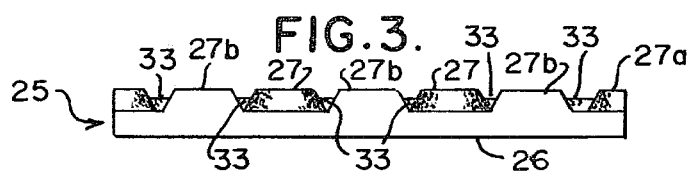
FIG. 4 is an end elevational view of the slab illustrated in FIGS. 2 and 3.

Intermediate the top of the burners 11 and the upper rim of fire box side and end walls 5 and 7, the side and end walls mount inwardly extending flanges 21, on which a sub-grate 23 is supported. The purpose of sub-grate 23 is to support a refractory slab 25, best seen in detail in FIGS. 2-4, the purpose of slab 25 being to simulate a bed of coals or briquettes and catch meat juice drippings, both to prevent their dripping onto the burners and to produce smoke from their drippings as they vaporize on the hot surface of the slab with consequent improvement therefrom in the flavor of the meat being cooked.

Slab 25 is molded from refractory, preferably ceramic, material and has a flat bottom surface 26. The top surface is formed with a series of frusto-conical upward projections 27 arranged in a plurality of parallel side-by-side rows extending lengthwise of the slab, the projections 27 of alternate rows being offset lengthwise of the slab from each other so that the projections 27 of every other row are disaligned from the projections 27 of the other rows. The sides 29 of projections 27 are inclined about 45° from the horizontal and thus form valleys between the adjoining portion of the adjacent projections. The projections 27a along the longitudinal rows adjacent the sides of the slab are bisected by the sides of the slab and the projections of the alternate rows at the ends of the slab are bisected by the end edges of the slab.

Slab 25 is reinforced by a wire mesh 30 molded within it, to provide adequate strength while minimizing thickness and weight of the slab.

In order to retain grease and rendered meat juices which have dripped on the slab on the upper surface of the slab so that they vaporize into smoke, the spaces along the sides and ends of the slab between adjacent projections 27a along the sides and projections 27 and 27b along the ends are blocked, respectively, by small, generally trapezoidal dams 31 and 33 which, in effect, form, with the intervening projections, an upstanding rim surrounding the slab. In addition to retaining the grease and rendered meat juices on the slab and preventing their dripping from the slab onto the fire, dams 31 and 33 substantially strengthen the slab at what would otherwise be the weakest points along its periphery, i.e., the valleys intervening between the adjacent projections 27, 27a and 27b.

Figure 5:
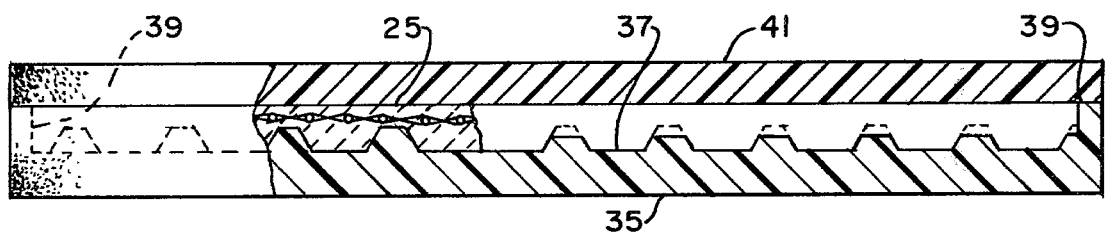
FIG. 5 is a side elevational view, partially sectionalized, of a slab prepared for shipping in its disposable mold, which serves as part of a protective shipping container.
Figure 6:
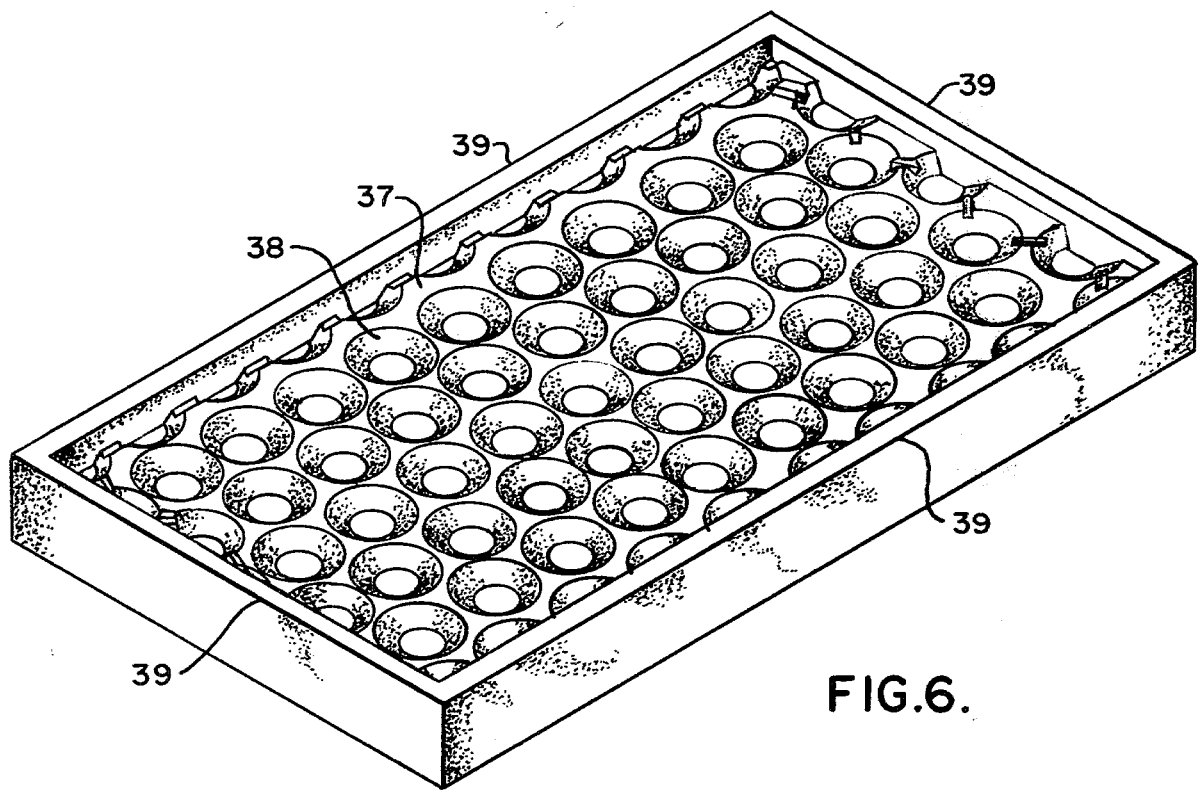
FIG. 6 is an isometric view of the bottom mold part.

Preferably, the slab 25 is formed in a mold 35 (FIGS. 5 and 6) having a flat surface 37 with depressions 38 therein to form projections 27, 27a and 27b on the slab, bounded by an upstanding rim 39 and a flat plate 41 forming the lower plane surface of the slab. Desirably, mold parts 37 and 41 are formed of polystyrene or similar lightweight, disposable material and are used as part of a shipping container for the unfired ceramic slab which, upon receipt by the user, is placed in the barbecue grill as shown in FIG. 1 and fired there while in service.

The details of the slab incorporating the invention, such as the specific shape of the coal-simulating bosses and of the peripheral dam members, may be varied substantially without departing from the spirit of the invention and the exclusive use of such modifications as come within the scope of the appended claims is contemplated.

I claim:

1. A molded refractory slab for positioning in a barbecue grill between the burner unit and the food-supporting grate having fluid retaining means for containing grease and rendered meat juices on the slab and preventing such fluids from dripping off the slab, said fluid retaining means including a plurality of uniformly spaced bosses simulating coals projecting upwardly from the slab top surface, and integral dam means connecting adjacent bosses nearest the periphery of the slab to form an upstanding continuous peripheral parapet around the slab periphery to contain grease and rendered meat juices on top of the slab and prevent such fluids from dripping off the sides of the slab.

2. A molded refractory slab according to claim 1 including a molded-in wire mesh reinforcement.

3. A molded refractory slab according to claim 1, wherein said bosses are circular in plan with tapered sides.

4. A molded refractory slab according to claim 3, wherein said bosses are of frusto-conical shape.

5. A molded refractory slab according to claim 4, wherein said bosses are arranged in parallel rows with the bosses of alternate rows offset longitudinally of the row with respect to each other.

6. A molded refractory slab according to claim 5, wherein the rows of bosses adjacent the sides of the slab are bisected by the respective edges of the slab, with dams adjacent the respective edges of the slab being of substantially triangular shape with their apices in the depression between adjacent bosses.

7. A molded refractory slab according to claim 6, wherein the sides of the slab normal to the rows of bosses bisect the end bosses of alternate rows and are substantially tangent to the end bosses of the remaining rows, the dams connecting the bosses of adjacent rows near the last-named sides of the slab being located substantially on common radii of the end bosses of adjacent rows.

* * * * *